(12) United States Patent
An et al.

(10) Patent No.: US 12,358,164 B2
(45) Date of Patent: Jul. 15, 2025

(54) GRIPPER AND ROBOT HAVING THE SAME

(71) Applicants: SHANGHAI FLEXIV ROBOTICS TECHNOLOGY CO., LTD., Shanghai (CN); FLEXIV LTD., Grand Cayman (KY)

(72) Inventors: Ran An, Santa Clara, CA (US); Juncai Peng, Shanghai (CN); Tingke Song, Shanghai (CN)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 836 days.

(21) Appl. No.: 17/617,088

(22) PCT Filed: Oct. 19, 2021

(86) PCT No.: PCT/CN2021/124582
§ 371 (c)(1),
(2) Date: Dec. 7, 2021

(87) PCT Pub. No.: WO2023/065102
PCT Pub. Date: Apr. 27, 2023

(65) Prior Publication Data
US 2023/0356414 A1    Nov. 9, 2023

(51) Int. Cl.
*B25J 15/12* (2006.01)
*B25J 13/08* (2006.01)

(52) U.S. Cl.
CPC ............. *B25J 15/12* (2013.01); *B25J 13/082* (2013.01)

(58) Field of Classification Search
CPC ...... B25J 13/081; B25J 13/082; B25J 13/084; B25J 13/085; B25J 15/0028; B25J 15/106; B25J 15/12; B25J 19/028
See application file for complete search history.

(56) References Cited

U.S. PATENT DOCUMENTS 4,132,318 A * 1/1979 Wang .................. B25J 9/0015
414/21
4,478,089 A * 10/1984 Aviles ..................... G01L 5/226
901/46

(Continued)

FOREIGN PATENT DOCUMENTS

| CN | 104260103 A | 1/2015 |
| CN | 206416169 U | 8/2017 |

(Continued)

OTHER PUBLICATIONS

International Search Report from International Application No. PCT/CN2021/124582 mailed Jun. 24, 2022.

(Continued)

*Primary Examiner* — Douglas A Hess
(74) *Attorney, Agent, or Firm* — Dorsey & Whitney LLP

(57) ABSTRACT

A gripper with at least one gripping jaw is provided. The at least one gripping jaw includes a base, a gripping portion configured to contact an object, a flexible member connecting the base and the gripping portion, and a sensor assembly located between the base and the gripping portion. The flexible member is configured to enable the gripping portion to deflect with respect to the base when the gripping portion is subjected to a force in a first direction from the object. The sensor assembly is configured to generate a signal in response to the deflection of the gripping portion.

8 Claims, 4 Drawing Sheets

(56) References Cited

U.S. PATENT DOCUMENTS

| | | | | |
|---|---|---|---|---|
| 4,819,978 | A | * | 4/1989 | Scheinman ............ B25J 13/082 294/902 |
| 5,609,381 | A | * | 3/1997 | Thom ..................... G01L 5/226 901/34 |
| 8,191,947 | B2 | * | 6/2012 | Jouan De Kervanoael ................. B25J 15/0253 901/34 |
| 8,985,656 | B2 | * | 3/2015 | Maffeis .................... B25J 15/10 294/207 |
| 2009/0302626 | A1 | * | 12/2009 | Dollar ..................... B25J 15/12 294/106 |
| 2012/0296472 | A1 | | 11/2012 | Nagai |
| 2018/0345502 | A1 | | 12/2018 | Amano et al. |
| 2021/0101292 | A1 | * | 4/2021 | Kuppuswamy ........ B25J 13/082 |
| 2021/0213627 | A1 | * | 7/2021 | Nabeto .................. B25J 9/1687 |

FOREIGN PATENT DOCUMENTS

| | | |
|---|---|---|
| CN | 208629459 U | 3/2019 |
| CN | 110744551 A | 2/2020 |
| CN | 110744577 A | 2/2020 |
| CN | 210704891 U | 6/2020 |
| CN | 111438543 A | 7/2020 |
| CN | 112091996 A | 12/2020 |
| CN | 212527771 U | 2/2021 |
| CN | 213082381 U | 4/2021 |
| CN | 113246141 A | 8/2021 |
| JP | S60167688 U | 11/1985 |
| JP | S6288590 A | 4/1987 |
| JP | H01316193 A | 12/1989 |
| JP | H081571 A | 1/1996 |
| JP | 8323678 A | 12/1996 |
| JP | 2003236786 A | 8/2003 |
| JP | 2010531239 A | 9/2010 |
| JP | 3214039 U | 11/2017 |
| JP | 2020015145 A | 1/2020 |

OTHER PUBLICATIONS

Office Action for Japanese Application No. 2024-523491 mailed Feb. 25, 2025.

* cited by examiner

GRIPPER AND ROBOT HAVING THE SAME

CROSS-REFERENCE TO RELATED APPLICATIONS

This application is a U.S. National Phase of PCT International Application No. PCT/CN2021/124582, filed Oct. 19, 2021, the contents of which is incorporated herein by reference in its entirety.

TECHNICAL FIELD

The present disclosure generally relates to robot technology, and more particularly to a gripper and a robot having the gripper.

BACKGROUND

Grippers are usually arranged on robots for gripping objects. To avoid damage to the objects due to excessive gripping forces, the gripper is usually equipped with a pressure sensor to detect the value of the gripping forces. According to a conventional gripper, a pressure sensor is provided on the fingertips of the gripper's jaws. However, such a pressure sensor is bulky, both in terms of space and weight.

SUMMARY

According to one aspect of the present disclosure, there is provided a gripper that includes a casing and at least one gripping jaw movably assembled on the casing. The at least one gripping jaw includes a base, a gripping portion configured to contact the object, and a flexible member connecting the base and the gripping portion and configured to enable the gripping portion to deflect with respect to the base when the gripping portion is subjected to a force in a first direction from the object. A sensor assembly is located between the base and the gripping portion and configured to generate a signal in response to the deflection of the gripping portion.

According to another aspect of the present disclosure, there is provided a robot that includes at least one articulated arm and a gripper provided at an end of the at least one articulated arm. The gripper includes a casing and at least one gripping jaw movably assembled on the casing. The at least one gripping jaw includes a base, a gripping portion configured to contact the object, and a flexible member connecting the base and the gripping portion and configured to enable the gripping portion to deflect with respect to the base when the gripping portion is subjected to a force in a first direction from the object. A sensor assembly is located between the base and the gripping portion and configured to generate a signal in response to the deflection of the gripping portion.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure.

DETAILED DESCRIPTION OF THE EMBODIMENTS

Aspects and advantages of the invention will be set forth in part in the following description, or may be obvious from the description, or may be learned through practice of the invention.

The present disclosure provides a gripper configured to grip an object. The gripper includes a casing and at least one gripping jaw movably assembled on the casing. The at least one gripping jaw includes a base, a gripping portion configured to contact the object, a flexible member connecting the base and the gripping portion, and a sensor assembly. The flexible member enables the gripping portion to deflect with respect to the base when the gripping portion is subjected to a force in a first direction from the object. The sensor assembly is located between the base and the gripping portion and configured to generate a signal in response to the deflection of the gripping portion.

Figure 1:
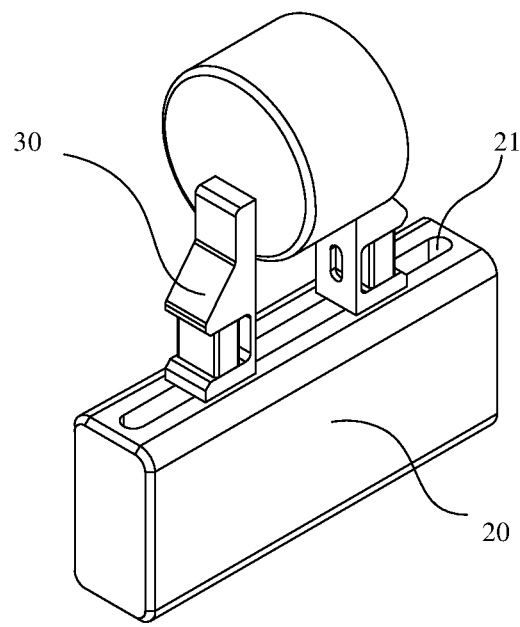
FIG. 1 is an isometric view of a gripper according to an embodiment of the present disclosure.

Referring to FIG. 1, a gripper 10 according to an embodiment of the present disclosure is provided, which includes a casing 20 and a pair of opposing gripping jaws 30 movably assembled on the casing 20 and configured to collectively grip an object. Specifically, the pair of gripping jaws 30 are slidable within a slot 21 of the casing 20 so that the pair of gripping jaws 30 get to move toward each other to grip the object, or move away from each other to release the object.

Figure 2:
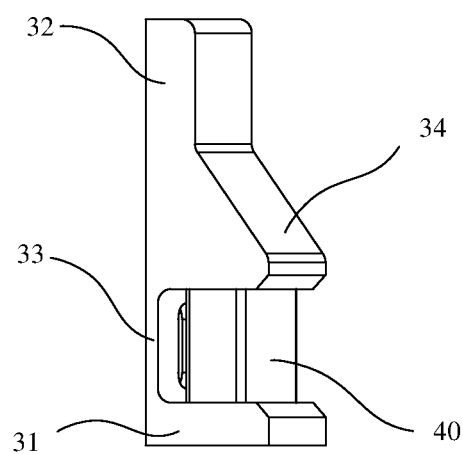
FIG. 2 is an isometric view of a gripping jaw of the gripper in FIG. 1.

FIG. 2 shows a detailed structure of the gripping jaw 30 according to an embodiment. The gripping jaw 30 includes a base 31, an upward gripping portion 32, and a flexible member 33 connecting the base 31 and the gripping portion 32. A sensor assembly 40 is located between the base 31 and gripping portion 32 and configured to detect a force exerted on the object by the gripping portion 32. In an embodiment, the gripping portion 32 includes a shoulder 34 extending laterally and spaced from the base 31, such that a space is defined between the base 31 and gripping portion 32, in which the sensor assembly 40 is accommodated and abuts both the base 31 and gripping portion 32.

It should be understood that, to enable the gripping jaws 30 to move within the slot 21 of the casing 20, the base 31 may further have a structure that extends downwardly to the slot 21 and engaged with a driver system (not shown) that drives the gripping jaws 30 to move within the slot 21.

Figure 3:
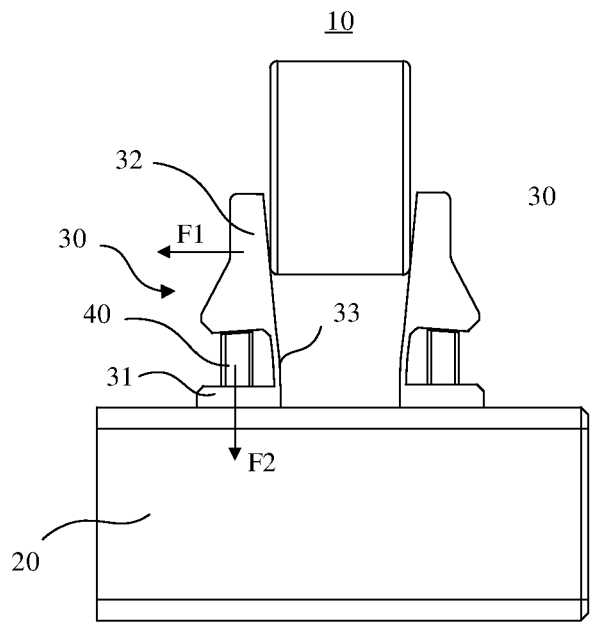
FIG. 3 a side view of the gripper in FIG. 1, showing an object is gripped by a pair of gripping jaws thereof.

Particularly referring to FIG. 3 which is a schematic diagram of the gripper 10 gripping an object. It can be seen that the gripping portions 32 of the pair of gripping jaws 30 are slightly deflected away from each other due to a force F1 in a first direction exerted thereon by the object, and which is the reaction force of the gripping force. To allow the deflection of the gripping portions 32, the flexible member 33 is appropriately configured. In an implementation, the flexible member 33 is integrally formed with the base 31 and the gripping portion 32, but has a thin structure which makes it flexible. In another implementation, the flexible member 33 may be a separate member from the base 31 and/or the gripping portion 32 and be made of a flexible material, such as rubber etc. In a further implementation, the flexible member 33 includes a flexible hinge. To further enhance the flexibility, a through hole may be provided on the flexible member 33.

Due to the force F1 in the first direction received by the gripping portion 32, the gripping portion 32 in turn exerts a force F2 in a second direction to the sensor assembly 40. The second direction is different than the first direction, and advantageously, substantially orthogonal to the first direction as shown in FIG. 3. It should be understood that the angle between the first and second directions may vary, depending on the structure of the gripping jaw 30, for example, the inclinations of the surfaces of the gripping portion 32 that contact the object and the sensor assembly 40 respectively. In the embodiment shown in FIG. 3, the sensor assembly 40 includes a piezoresistor which has a varying resistance depending the pressure exerted thereon, and is thus able to generate a signal indicative of the force exerted thereon, in response to the deflection of the gripping portion 32 with respect to the base 31. In addition, because of the good high frequency characteristics of the piezoresistor, the measurement accuracy can be ensured, which is particularly useful in the cases that objects are gripped in a high frequency.

It should be understood that other types of pressure sensor other than a piezoresistor can be used, as long as it is able to generate a signal indicate of a force exerted thereon due to deflection of the gripping portion 32. The signal of the pressure sensor can be led out through, for example, a cable connected thereto, or in a wireless way.

The magnitude of the force F2 can thus be determined based on the signal of the sensor assembly 40, and according to the magnitude of the force F2, the deflection of the gripping portion 32 and further the force F1 can also be determined. A model that calculates the force exerted on the object, namely the force F1, based on the signal of the sensor assembly 40 can be thus created.

Figure 4:
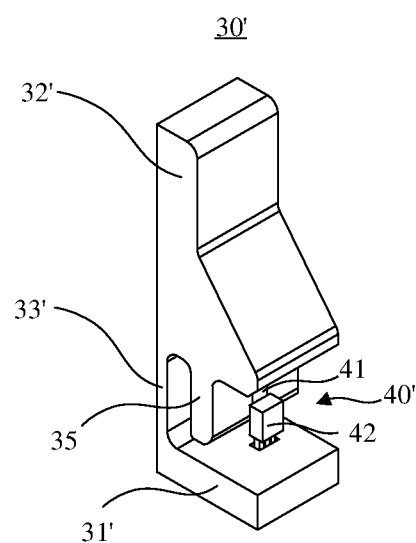
FIG. 4 is an isometric view of a gripping jaw according to another embodiment of the present disclosure.
Figure 5:
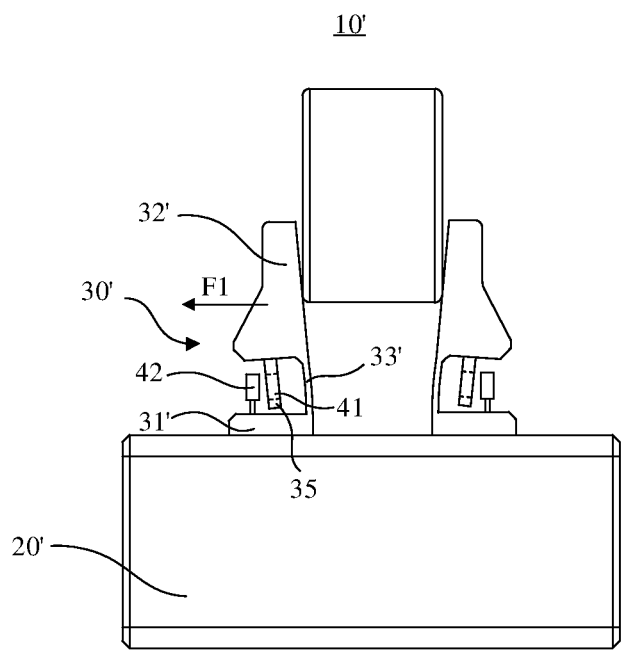
FIG. 5 is a side view of the gripper using a pair of the gripping jaws as shown in FIG. 4, showing an object is gripped by the gripping jaws.

FIG. 4 shows a gripping jaw 30' according to another embodiment of the present disclosure. The gripping jaw 30' includes a base 31', a gripping portion 32', and a flexible member 33' connecting the base 31' and the gripping portion 32'. A sensor assembly 40' is located between the base 31' and the gripping portion 32', and configured to generate a signal in response to the deflection of the gripping portion 32'. In an embodiment, the sensor assembly 40' includes a displacement detecting assembly that generates the signal indicative of the displacement of the gripping portion 32' with respect to the base 31'. In an embodiment, the displacement detecting assembly includes a magnet 41 and a hall-effect sensor 42, one of which is fixed with respect to the base 31', and the other of which is fixed with respect to the gripping portion 32'. In a specific implementation as shown in FIG. 5, the magnet 41 is fixed with respect to the gripping portion 32' by being retained by a downwardly extending protrusion 35 from the gripping portion 32', while the hall-effect sensor 42 is fixed with respect to the base 31' by being held by the base 31'. Meanwhile, the magnet 41 and the hall-effect sensor 42 are located adjacent to each other in a lateral direction such that the hall-effect sensor 42 is able to detect the magnetic field of the magnet 41.

Referring to FIG. 5 which shows the gripper 10' gripping an object, as the gripping portion 32' deflects with respect to the base 31', the magnet 41 also displaces slightly along with the protrusion 35, for example, away from the hall-effect sensor 42, so that the signal of the hall-effect sensor 42 indicative of the location of the hall-effect sensor 42 with respect to the magnet 41 changes. The displacement of the magnet 41 and the deflection of the gripping portion 32' can thus be determined based on the signal of the sensor assembly 40', and according to the deflection of the gripping portion 32', the force F1 exerted on the gripping portion 32' can also be determined. The relationship between the displacement of the magnet 41 and the deflection of the gripping portion 32' depends on the overall structure of the gripping jaw 30', including the distance between the protrusion 35 and the flexible member 33', for example. A model that calculates the force exerted on the object, namely the force F1, based on the signal of the sensor assembly 40' can also be created.

In a modified embodiment, the magnet and the hall-effect sensor are located adjacent to each other in a longitudinal direction perpendicular to the above-described lateral direction. For example, the magnet may be fixed at the bottom of the gripping portion 32' and above the hall-effect sensor, such that the hall-effect sensor is also able to generate, in response to the deflection of the gripping portion 32', a signal indicative of the location of the magnet with respect to the hall-effect sensor. A calculation model for this modified embodiment can also be created, which is different form the that of the gripping jaw 30' as described above.

It would be obvious to those skilled in the art that the magnet 41 and the hall-effect sensor 42 as described above can be replaced by various other types of displacement detecting assembly, including, for example, an optical sensor, an inductive sensor, etc.

Duo to configuration of the gripper according to various embodiments as described above, the sensor assembly does not take up extra space in the gripping jaw, which simplifies the structure of the gripper and makes the gripper more flexible.

Figure 6:
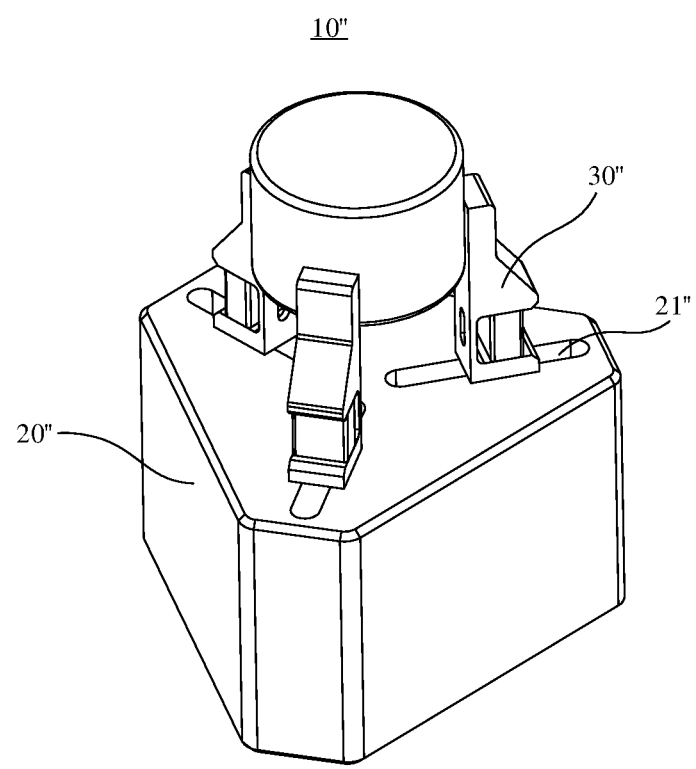
FIG. 6 is an isometric view of a gripper according to another embodiment of the present disclosure.

FIG. 6 shows a gripper 10" according to another embodiment of the present disclosure. The gripper 10" includes a casing 20" and a triple of gripping jaws 30" arranged circumferentially on the casing 20" and slidable within slots 21" of the casing 20" respectively to collectively grip an object. It can be understood that the structure of the gripper 10" is applicable for both a pressure sensor and a displacement detecting assembly as described above, although only pressure sensors are shown in FIG. 6.

In another embodiment, one of the gripping jaws of the gripper may be fixed on the casing, and the remaining one or more gripping jaws can be movable on the casing as described above. In this case, the sensor assembly can still be provided on any of the gripping jaws, no matter it is movable or not.

Figure 7:
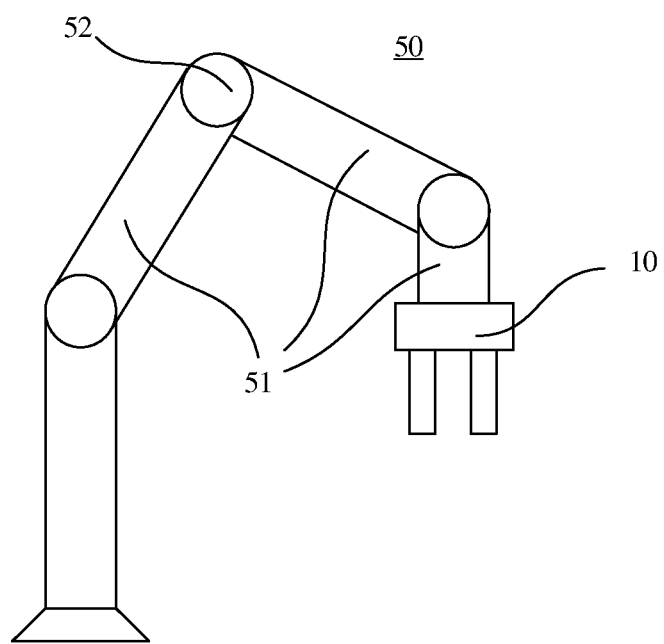
FIG. 7 is schematic diagram of a robot with a gripper according to an embodiment of the present disclosure.

In an application, the gripper of the present disclosure can be applied to a robot, for example, a manipulator that move objects on automated production lines. Referring to FIG. 7, according to an embodiment of the present disclosure, a robot 50 is provided which includes at least one articulated arm 51 and a gripper 10 provided at an end of the articulated arm 51. In attempt to grip or release an object, the articulated arm 51 moves the gripper 10 to a proper position, and then a driver system controls motions of the gripping jaws to grip or release an object. The at least one articulated arm 51 may include, for example, a couple of articulated arms rotatably connected to one another in series by joints 52 so as to expand the range of motion of the gripper 10.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "includes" when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A gripper configured to grip an object, the gripper comprising:
   a casing; and
   at least one gripping jaw movably assembled on the casing, the at least one gripping jaw comprising:
   a base;
   a gripping portion configured to contact the object;
   a flexible member connecting the base and the gripping portion and configured to enable the gripping portion to deflect with respect to the base when the gripping portion is subjected to a force in a first direction from the object; and
   a sensor assembly located between the base and the gripping portion and configured to generate a signal in response to the deflection of the gripping portion;
   wherein the gripping portion is configured to exert a force in a second direction other than the first direction to the sensor assembly when receiving the force in the first direction, and the sensor assembly is configured to generate the signal indicative of the force in the second direction; and
   wherein the sensor assembly comprises a piezoresistor and the gripping portion comprises a shoulder extending laterally and spaced from the base so as to define a space therebetween for accommodating the sensor assembly, the piezoresistor abutting against both the shoulder and the base.

2. The gripper of claim 1, wherein the first direction and the second direction are orthogonal to each other.

3. The gripper of claim 1, wherein the flexible member comprises a flexible hinge.

4. The gripper of claim 1, wherein the flexible member is integrally formed with the base and the gripping portion.

5. The gripper of claim 1, wherein the casing defines a slot, and the at least one gripping jaw comprises a pair of gripping jaws slidable within the slot to collectively grip the object.

6. The gripper of claim 1, wherein the casing defines a triple of slots, and the at least one gripping jaw comprises a triple of gripping jaws arranged circumferentially and slidable within the slots respectively to collectively grip the object.

7. A robot, comprising:
   at least one articulated arm and a gripper provided at an end of the at least one articulated arm, wherein the gripper comprises:
   a casing; and
   at least one gripping jaw movably assembled on the casing, the at least one gripping jaw comprising:
   a base;
   a gripping portion configured to contact an object;
   a flexible member connecting the base and the gripping portion and configured to enable the gripping portion to deflect with respect to the base when the gripping portion is subjected to a force in a first direction from the object; and
   a sensor assembly located between the base and the gripping portion and configured to generate a signal in response to the deflection of the gripping portion;
   wherein the gripping portion is configured to exert a force in a second direction other than the first direction to the sensor assembly when receiving the force in the first direction, and the sensor assembly is configured to generate the signal indicative of the force in the second direction; and
   wherein the sensor assembly comprises a piezoresistor and the gripping portion comprises a shoulder extending laterally and spaced from the base so as to define a space therebetween for accommodating the sensor assembly, the piezoresistor abutting against both the shoulder and the base.

8. The robot of claim 7, wherein the first direction and the second direction are orthogonal to each other.

* * * * *